(12) United States Patent
Lin et al.

(10) Patent No.: US 7,822,123 B2
(45) Date of Patent: Oct. 26, 2010

(54) EFFICIENT REPEAT PADDING FOR HYBRID VIDEO SEQUENCE WITH ARBITRARY VIDEO RESOLUTION

(75) Inventors: Chih-Lung Lin, Redmond, WA (US); Pohsiang Hsu, Redwood, WA (US); Sridhar Srinivasan, Redmond, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1005 days.

(21) Appl. No.: 10/960,384

(22) Filed: Oct. 6, 2004

(65) Prior Publication Data

US 2006/0072669 A1    Apr. 6, 2006

(51) Int. Cl.
*H04N 7/12* (2006.01)
(52) U.S. Cl. .................. 375/240.24; 375/240.01; 375/240.29
(58) Field of Classification Search ............ 375/240.24, 375/240.01, 240.29; 348/441, 445, 449, 348/446, 447
See application file for complete search history.

(56) References Cited

U.S. PATENT DOCUMENTS

| | | | |
|---|---|---|---|
| 5,300,949 A | 4/1994 | Rodriquez et al. | |
| 5,414,469 A | 5/1995 | Gonzales et al. | |
| 5,611,038 A | 3/1997 | Shaw et al. | |
| 5,764,296 A | 6/1998 | Shin | |
| RE35,910 E | 9/1998 | Nagata et al. | |
| 5,821,986 A | 10/1998 | Yuan et al. | |
| 5,828,421 A | 10/1998 | Boyce et al. | |
| 5,864,637 A | 1/1999 | Liu et al. | |
| 5,949,919 A | 9/1999 | Chen | |
| 5,970,173 A | 10/1999 | Lee et al. | |
| 6,002,801 A | 12/1999 | Strongin et al. | |
| 6,014,694 A | 1/2000 | Aharoni et al. | |
| 6,104,434 A | 8/2000 | Nakagawa et al. | |
| 6,157,396 A | 12/2000 | Margulis et al. | |
| 6,339,656 B1 | 1/2002 | Marui | |

(Continued)

FOREIGN PATENT DOCUMENTS

JP         4-207684         7/1992

(Continued)

OTHER PUBLICATIONS

International Standard ISO/IEC 14496-2 Second Edition Dec. 1, 2001. Information Technology-Coding of Audio-Visual Objects—part 2: Visual p. 144, 201-219.*

(Continued)

*Primary Examiner*—Tung Vo
*Assistant Examiner*—Anner Holder
(74) *Attorney, Agent, or Firm*—Klarkquist Sparkman, LLP

(57) ABSTRACT

A video codec provides efficient repeat padding of hybrid video sequences having arbitrary video resolution. The video codec repeat pads to expand the active content of pictures in the video sequence out to meet an adaptive vertical macroblock alignment restriction that varies by picture type. For progressive type pictures, the video codec repeats the last row or horizontal boundary edge of the active content. For interlaced type pictures, the video coded repeats the last two rows (last row of each interlaced field) of the active content. This repeat padding differing by picture type provides a better prediction (lower prediction error residual) for macroblocks in following predicted frames whose motion vector points into the padded region.

16 Claims, 15 Drawing Sheets

U.S. PATENT DOCUMENTS

| | | | |
|---|---|---|---|
| 6,418,166 | B1 | 7/2002 | Wu et al. |
| 6,499,060 | B1 | 12/2002 | Wang et al. |
| 6,510,177 | B1 | 1/2003 | De Bonet et al. |
| 6,600,785 | B1 | 7/2003 | Nishigori et al. |
| 6,728,317 | B1 | 4/2004 | Demos |
| 6,823,014 | B2 | 11/2004 | Kim |
| 6,937,291 | B1 | 8/2005 | Gryskiewicz |
| 7,039,115 | B1 | 5/2006 | Wu et al. |
| 7,046,730 | B2 * | 5/2006 | Boon .................. 375/240.12 |
| 7,495,646 | B2 | 2/2009 | Kawabe et al. |
| 2002/0064226 | A1 | 5/2002 | Bauer et al. |
| 2002/0186890 | A1 | 12/2002 | Lee et al. |
| 2003/0185306 | A1 | 10/2003 | MacInnis et al. |
| 2004/0042549 | A1 | 3/2004 | Huang et al. |
| 2004/0213345 | A1 | 10/2004 | Holcomb et al. |
| 2006/0072672 | A1 | 4/2006 | Lin et al. |
| 2006/0072673 | A1 | 4/2006 | Lin et al. |

FOREIGN PATENT DOCUMENTS

| | | |
|---|---|---|
| JP | 4207684 | 7/1992 |
| JP | 2000-134618 | 5/2000 |
| JP | 2000-165866 | 6/2000 |
| JP | 2000165866 | 6/2000 |
| WO | WO 00/33581 | 6/2000 |
| WO | WO 01/95633 | 12/2001 |

OTHER PUBLICATIONS

"DivX Multi Standard Video Encoder," 2 pp. (Downloaded from the World Wide Web on Jan. 24, 2006).

Sullivan et al., "The H.264/AVC Advanced Video Coding Standard: Overview and Introduction to the Fidelity Range Extensions," 21 pp. (Aug. 2004).

Wien, "Variable Block-Size Transforms for Hybrid Video Coding," Dissertation, 182 pp. (Feb. 2004).

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

Joint Video Team (JVT) of ISO/IEC MPEG & ITU-T VCEG, "Joint Final Committee Draft (JFCD) of Joint Video Specification," JVT-D157, 207 pp. (Aug. 2002).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video l," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, 14496-2, Committee Draft," 330 pp. (1998).

ISO/IEC, "Information Technology—Coding of Audio-Visual Objects: Part 2:Visual," 14496-2, 706 pp. (2004).

Wikipedia, "MPEG-1," uploaded from internet on Aug. 13, 2009, http://en.wikipedia.org/wiki/MPEG1, 20 pp.

Dufaux et al., "Motion-compensated generic coding of video based on a multiresolution data structure," *Optical Engineering*, vol. 32, No. 7, pp. 1559-1570 (Jul. 1993).

Einarsson et al., "Mixed Resolution Video Coding for Low Bit-Rate Channels," Proc. Int'l Workshop on Coding Techniques for Very Low Bit-Rate Video: VLBV97, Linköping, Sweden, pp. 77-80 (Jul. 1997).

\* cited by examiner

Figure 1, prior art

Frame Layer, for Frames Having Interlace I-fields, and/or BI-fields, Bitstream Syntax 900

```
//Decode true frame size (coded_width and coded_height)
from entry-point header padded_width = (Integer) (coded_width + 15) / 16;

if (frame_type == progressive) {
    padded_height = (Integer) (coded_height + 15) / 16;
} else {
    padded_height = (Integer) (coded_height + 31) / 32;
}
```

Software 1680 Implementing Video
Encoder/Decoder With Efficient Repeat
Padding for Hybrid Video Sequence with
Arbitrary Video Resolution

EFFICIENT REPEAT PADDING FOR HYBRID VIDEO SEQUENCE WITH ARBITRARY VIDEO RESOLUTION

TECHNICAL FIELD

The present invention relates to techniques for digitally encoding, decoding and processing video.

BACKGROUND

Full-motion video displays based upon analog video signals have long been available in the form of television. With recent advances in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video displays include large numbers of image frames that are played or rendered successively at frequencies of between 30 and 75 Hz. Each image frame is a still image formed from an array of pixels based on the display resolution of a particular system. As examples, VHS-based systems have display resolutions of 320×480 pixels, NTSC-based systems have display resolutions of 720×486 pixels, and high-definition television (HDTV) systems under development have display resolutions of 1360×1024 pixels.

The amounts of raw digital information included in video sequences are massive. Storage and transmission of these amounts of video information is infeasible with conventional personal computer equipment. Consider, for example, a digitized form of a relatively low resolution VHS image format having a 320×480 pixel resolution. A full-length motion picture of two hours in duration at this resolution corresponds to 100 gigabytes of digital video information. By comparison, conventional compact optical disks (CDs) have capacities of about 0.6 gigabytes, magnetic hard disks have capacities of 1-2 gigabytes, and compact optical disks under development have capacities of up to 8 gigabytes.

To address the limitations in storing or transmitting such massive amounts of digital video information, various video compression standards or processes have been established, including MPEG-1, MPEG-2, and H.26X. These video compression techniques utilize similarities between successive image frames, referred to as temporal or interframe correlation, to provide interframe compression in which motion data and error signals are used to encode changes between frames.

In addition, the conventional video compression techniques utilize similarities within image frames, referred to as spatial or intraframe correlation, to provide intraframe compression in which the image samples within an image frame are compressed. Intraframe compression is based upon conventional processes for compressing still images, such as discrete cosine transform (DCT) encoding. This type of coding is sometimes referred to as "texture" or "transform" coding. A "texture" generally refers to a two-dimensional array of image sample values, such as an array of chrominance and luminance values or an array of alpha (opacity) values. The term "transform" in this context refers to how the image samples are transformed into spatial frequency components during the coding process. This use of the term "transform" should be distinguished from a geometric transform used to estimate scene changes in some interframe compression methods.

Interframe compression typically utilizes motion estimation and compensation to encode scene changes between frames. Motion estimation is a process for estimating the motion of image samples (e.g., pixels) between frames. Using motion estimation, the encoder attempts to match blocks of pixels in one frame with corresponding pixels in another frame. After the most similar block is found in a given search area, the change in position of the pixel locations of the corresponding pixels is approximated and represented as motion data, such as a motion vector. Motion compensation is a process for determining a predicted image and computing the error between the predicted image and the original image. Using motion compensation, the encoder applies the motion data to an image and computes a predicted image. The difference between the predicted image and the input image is called the error signal. Since the error signal is just an array of values representing the difference between image sample values, it can be compressed using the same texture coding method as used for intraframe coding of image samples.

I. Macroblock-Based Intra- and Inter-Frame Compression

Although differing in specific implementations, the MPEG-1, MPEG-2, and H.26X video compression standards are similar in a number of respects. The following description of the MPEG-2 video compression standard is generally applicable to the others.

MPEG-2 provides interframe compression and intraframe compression based upon square blocks or arrays of pixels in video images. A video image is divided into image sample blocks called macroblocks having dimensions of 16×16 pixels. In MPEG-2, a macroblock comprises four luminance blocks (each block is 8×8 samples of luminance (Y)) and two chrominance blocks (one 8×8 sample block each for Cb and Cr).

In MPEG-2, interframe coding is performed on macroblocks. An MPEG-2 encoder performs motion estimation and compensation to compute motion vectors and block error signals. For each block $M_N$ in an image frame N, a search is performed across the image of a next successive video frame N+1 or immediately preceding image frame N-1 (i.e., bi-directionally) to identify the most similar respective blocks $M_{N+1}$ or $M_{N-1}$. The location of the most similar block relative to the block $M_N$ is encoded with a motion vector (DX,DY). The motion vector is then used to compute a block of predicted sample values. These predicted sample values are compared with block $M_N$ to determine the block error signal. The error signal is compressed using a texture coding method such as discrete cosine transform (DCT) encoding. The error signal usually has a lower entropy than the original macroblock, and can therefore be encoded as fewer bits.

II. Interlaced Video and Progressive Video

A video frame contains lines of spatial information of a video signal. For progressive video, these lines contain samples starting from one time instant and continuing through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

A typical interlaced video frame consists of two fields scanned starting at different times. For example, referring to FIG. 1, an interlaced video frame 100 includes top field 110 and bottom field 120. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

III. Macroblock Alignment Requirement

As previously remarked, previously existing video systems have had a variety of display resolutions or picture sizes, such as the NTSC resolution of 720×486 pixels, etc. On the other hand, digital video compression standards generally are macroblock-based. Digital video compression standards therefore have generally restricted the vertical size or height of the video to be an integral number of macroblocks. In cases where the vertical size of input video is less than an integral number of macroblocks, the pictures are extended out to an integral number of macroblocks by adding "padding" to the active video content.

In most video standards, there is a different height restriction for video sequences coded entirely in progressive mode than is imposed on interlaced or mixed interlaced/progressive content. In particular, a video sequence of entirely progressive content must have a height that is a multiple of 16 pixels (an integral number of progressive mode macroblocks). Whereas, a video sequence with interlaced or mixed interlaced/progressive content is restricted in height to multiples of 32 pixels. This is because each field of the interlaced content is required to be an integral number of macroblocks in height, such that the frame as a whole (which is composed of two fields) must be a multiple of 2 macroblocks in height. In cases where the input video does not meet these requirements, such as video captured at NTSC resolution, the video is extended to a legal height by padding prior to compression. Later, the decoder decodes the height extended data and extracts out the original video content. This padding of the video introduces overhead in the encoding as the extended data outside the original video (padding) has to be compressed and sent to the decoder.

IV. Repeat Padding

As previously remarked, interframe compression typically is performed by performing motion estimation and prediction for the macroblocks in a predicted frame with respect to a reference intra-coded frame. Some previously existing video systems have permitted the motion estimation to extend beyond the active picture contents of the reference intra-coded frame. In some such cases, the video systems have derived the "content" outside the picture by repeating the pixels of the picture edge to "fill" an extended region that may be used for motion estimation purposes. For example, the bottom row of the picture is repeated to vertically expand the picture downward to fill an extended motion estimation region below the picture. Likewise, the top row, left and right columns are repeated at top left and right sides to provide extended motion estimation regions at those sides of the reference picture. This process of filling areas outside the active picture content is sometimes referred to as "repeat padding."

SUMMARY

Various video codec tools and techniques described herein provide for efficient repeat padding of hybrid video sequences having arbitrary video resolution. Repeat padding refers to the process of filling the pixel values outside of active video boundaries, such as for purposes of meeting a macroblock alignment requirement or providing motion estimation. The active video size is the size of video with active content (e.g., the source video content), and does not include the expanded region added to fulfill the macroblock alignment requirement or motion estimation. Hybrid video sequences are those containing a mix of progressive and interlaced picture content.

In one aspect of the repeat padding techniques described herein, progressive and interlaced pictures of a hybrid video sequence are treated differently. The repeat padding of progressive pictures is done by repeating the edges of the active video boundary to fill out the expanded region. More specifically, the edge row of the active content is repeated to pad the picture vertically, while the edge column of the active content is repeated to pad the picture horizontally. Repeat padding of interlaced content pictures, on the other hand, is accomplished by repeating the last two edges rows of the active video (i.e., the last row of each interlaced field) to pad the picture vertically, whereas the edge column is repeated to pad horizontally. This repeat padding using the active video boundary has the benefit of serving as better prediction area for the following frames. For a subsequent predictively coded frame, a macroblocks motion vector can point to the expanded region. This typically provides a better prediction of the macroblock in the predicted frame, often resulting in a zero or minimal block error signal that can be more efficiently encoded. The encoder thus can effectively "zero"-out the information that otherwise has to be transmitted for the expanded region.

Additional features and advantages of the invention will be made apparent from the following detailed description of embodiments that proceeds with reference to the accompanying drawings.

BRIEF DESCRIPTION OF THE DRAWINGS

FIG. 15 is a pseudo-code listing of program code for calculating padded height and width of pictures in a hybrid video sequence.

DETAILED DESCRIPTION

The following description is directed to implementations of an efficient repeat padding technique that provides different repeat padding of progressive and interlaced type pictures that may serve as better prediction regions for following predicted frames. An exemplary application of this technique is in a video codec system. Accordingly, the repeat padding technique is described in the context of an exemplary video encoder/decoder utilizing an encoded bit stream syntax. In particular, one described implementation of the technique is in a video codec that complies with the Windows Media Video version 9 (WMV9)/Video Codec-9 (VC-9) standards. Alternatively, the technique can be incorporated in various video codec implementations and standards that may vary in details from the below described exemplary video codec and syntax.

1. Generalized Video Encoder and Decoder

Figure 2:
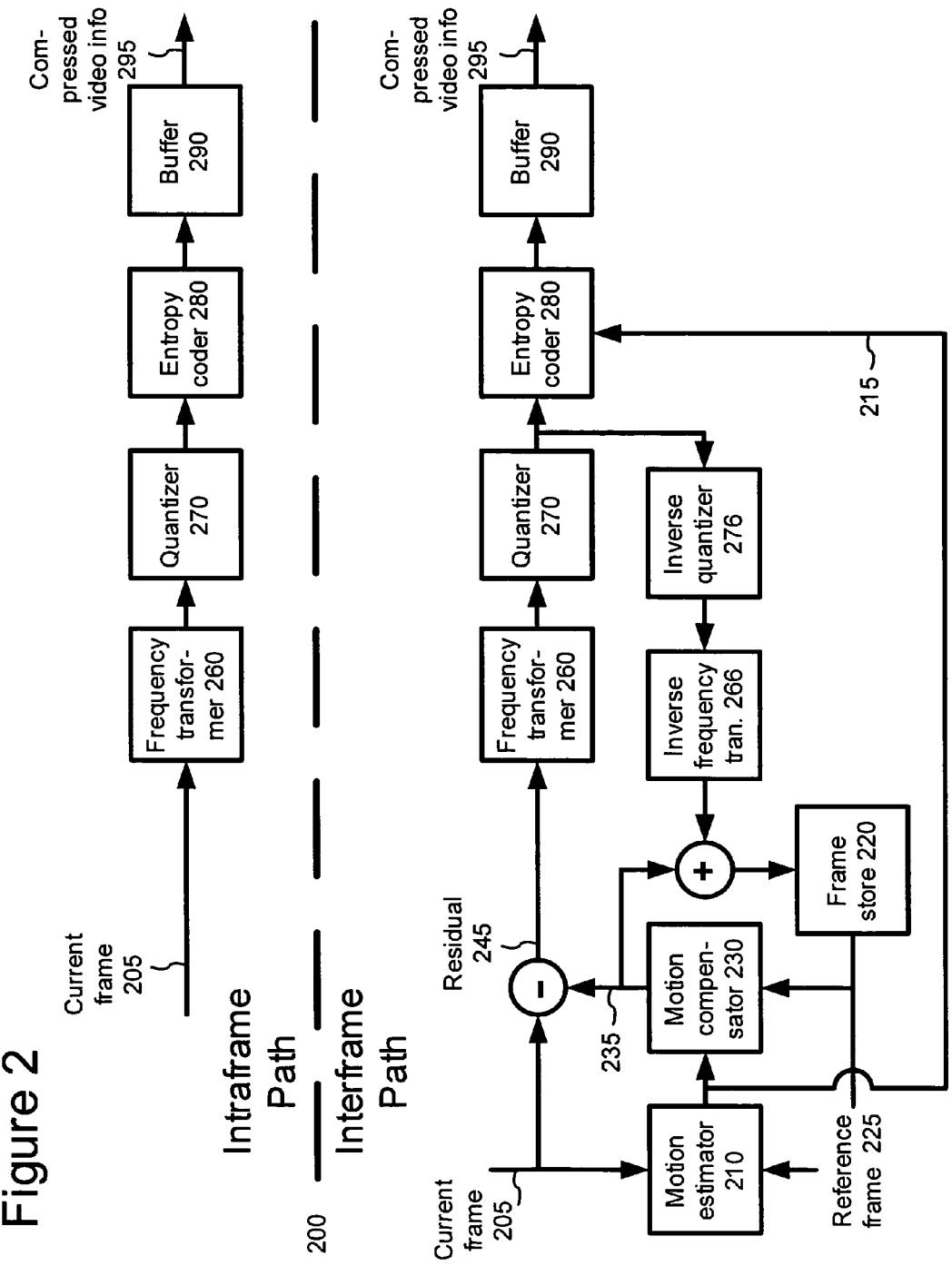
FIG. 2 is a block diagram of an example video encoder in which the repeat padding for hybrid video sequences with arbitrary video resolution technique is implemented.
Figure 3:
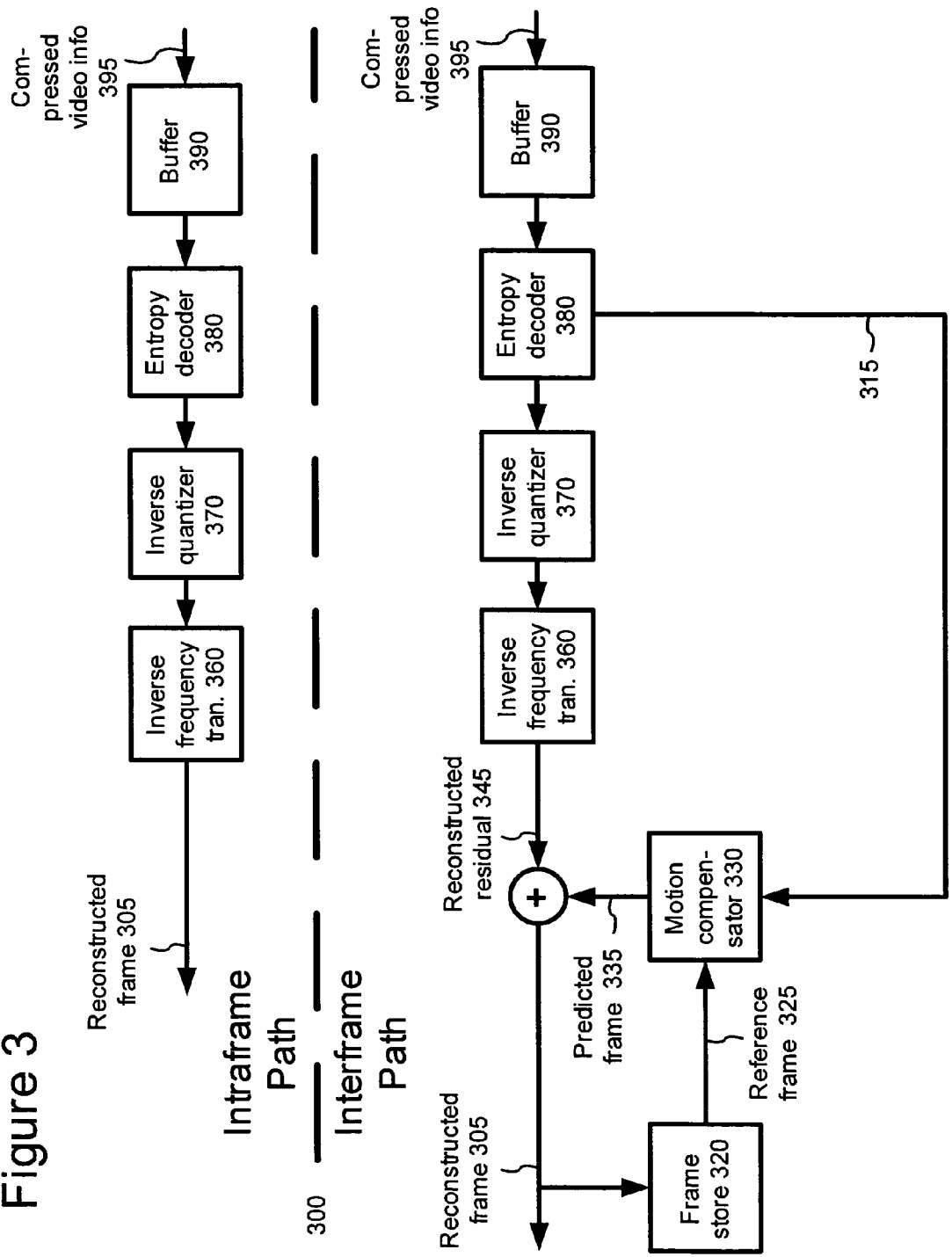
FIG. 3 is a block diagram of an example video decoder in which the repeat padding for hybrid video sequences with arbitrary video resolution technique is implemented.

FIG. 2 is a block diagram of a generalized video encoder (200) and FIG. 3 is a block diagram of a generalized video decoder (300), in which the variable coding resolution technique can be incorporated.

The relationships shown between modules within the encoder and decoder indicate the main flow of information in the encoder and decoder; other relationships are not shown for the sake of simplicity. In particular, FIGS. 2 and 3 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder (200) and decoder (300) are block-based and use a 4:2:0 macroblock format with each macroblock including 4 luminance 8×8 luminance blocks (at times treated as one 16×16 macroblock) and two 8×8 chrominance blocks. Alternatively, the encoder (200) and decoder (300) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 2 is a block diagram of a general video encoder system (200). The encoder system (200) receives a sequence of video frames including a current frame (205), and produces compressed video information (295) as output. Particular embodiments of video encoders typically use a variation or supplemented version of the generalized encoder (200).

The encoder system (200) compresses predicted frames and key frames. For the sake of presentation, FIG. 2 shows a path for key frames through the encoder system (200) and a path for forward-predicted frames. Many of the components of the encoder system (200) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (205) is a forward-predicted frame, a motion estimator (210) estimates motion of macroblocks or other sets of pixels of the current frame (205) with respect to a reference frame, which is the reconstructed previous frame (225) buffered in the frame store (220). In alternative embodiments, the reference frame is a later frame or the current frame is bi-directionally predicted. The motion estimator (210) outputs as side information motion information (215) such as motion vectors. A motion compensator (230) applies the motion information (215) to the reconstructed previous frame (225) to form a motion-compensated current frame (235). The prediction is rarely perfect, however, and the difference between the motion-compensated current frame (235) and the original current frame (205) is the prediction residual (245). Alternatively, a motion estimator and motion compensator apply another type of motion estimation/compensation.

A frequency transformer (260) converts the spatial domain video information into frequency domain (i.e., spectral) data. For block-based video frames, the frequency transformer (260) applies a transform described in the following sections that has properties similar to the discrete cosine transform ["DCT"]. In some embodiments, the frequency transformer (260) applies a frequency transform to blocks of spatial prediction residuals for key frames. The frequency transformer (260) can apply an 8×8, 8×4, 4×8, or other size frequency transforms.

A quantizer (270) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (200) can use frame dropping, adaptive filtering, or other techniques for rate control.

When a reconstructed current frame is needed for subsequent motion estimation/compensation, an inverse quantizer (276) performs inverse quantization on the quantized spectral data coefficients. An inverse frequency transformer (266) then performs the inverse of the operations of the frequency transformer (260), producing a reconstructed prediction residual (for a predicted frame) or a reconstructed key frame. If the current frame (205) was a key frame, the reconstructed key frame is taken as the reconstructed current frame (not shown). If the current frame (205) was a predicted frame, the reconstructed prediction residual is added to the motion-compensated current frame (235) to form the reconstructed current frame. The frame store (220) buffers the reconstructed current frame for use in predicting the next frame. In some embodiments, the encoder applies a deblocking filter to the reconstructed frame to adaptively smooth discontinuities in the blocks of the frame.

The entropy coder (280) compresses the output of the quantizer (270) as well as certain side information (e.g., motion information (215), quantization step size). Typical entropy coding techniques include arithmetic coding, differential coding, Huffman coding, run length coding, LZ coding, dictionary coding, and combinations of the above. The entropy coder (280) typically uses different coding techniques for different kinds of information (e.g., DC coefficients, AC coefficients, different kinds of side information), and can choose from among multiple code tables within a particular coding technique.

The entropy coder (280) puts compressed video information (295) in the buffer (290). A buffer level indicator is fed back to bitrate adaptive modules. The compressed video information (295) is depleted from the buffer (290) at a constant or relatively constant bitrate and stored for subsequent streaming at that bitrate. Alternatively, the encoder system (200) streams compressed video information immediately following compression.

Before or after the buffer (290), the compressed video information (295) can be channel coded for transmission over the network. The channel coding can apply error detection and correction data to the compressed video information (295).

B. Video Decoder

FIG. 3 is a block diagram of a general video decoder system (300). The decoder system (300) receives information (395) for a compressed sequence of video frames and produces output including a reconstructed frame (305). Particular embodiments of video decoders typically use a variation or supplemented version of the generalized decoder (300).

The decoder system (300) decompresses predicted frames and key frames. For the sake of presentation, FIG. 3 shows a path for key frames through the decoder system (300) and a path for forward-predicted frames. Many of the components of the decoder system (300) are used for compressing both key frames and predicted frames. The exact operations performed by those components can vary depending on the type of information being compressed.

A buffer (390) receives the information (395) for the compressed video sequence and makes the received information available to the entropy decoder (380). The buffer (390) typically receives the information at a rate that is fairly constant over time, and includes a jitter buffer to smooth short-term variations in bandwidth or transmission. The buffer (390) can include a playback buffer and other buffers as well. Alternatively, the buffer (390) receives information at a varying rate.

Before or after the buffer (390), the compressed video information can be channel decoded and processed for error detection and correction.

The entropy decoder (380) entropy decodes entropy-coded quantized data as well as entropy-coded side information (e.g., motion information, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (380) frequently uses different decoding techniques for different kinds of information (e.g., DC coefficients, AC coefficients, different kinds of side information), and can choose from among multiple code tables within a particular decoding technique.

If the frame (305) to be reconstructed is a forward-predicted frame, a motion compensator (330) applies motion information (315) to a reference frame (325) to form a prediction (335) of the frame (305) being reconstructed. For example, the motion compensator (330) uses a macroblock motion vector to find a macroblock in the reference frame (325). A frame buffer (320) stores previous reconstructed frames for use as reference frames. Alternatively, a motion compensator applies another type of motion compensation. The prediction by the motion compensator is rarely perfect, so the decoder (300) also reconstructs prediction residuals.

When the decoder needs a reconstructed frame for subsequent motion compensation, the frame store (320) buffers the reconstructed frame for use in predicting the next frame. In some embodiments, the encoder applies a deblocking filter to the reconstructed frame to adaptively smooth discontinuities in the blocks of the frame.

An inverse quantizer (370) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (360) converts the quantized, frequency domain data into spatial domain video information. For block-based video frames, the inverse frequency transformer (360) applies an inverse transform described in the following sections. In some embodiments, the inverse frequency transformer (360) applies an inverse frequency transform to blocks of spatial prediction residuals for key frames. The inverse frequency transformer (360) can apply an 8×8, 8×4, 4×8, or other size inverse frequency transforms.

2. Frame Modes and Macroblock Structure

Figure 1:
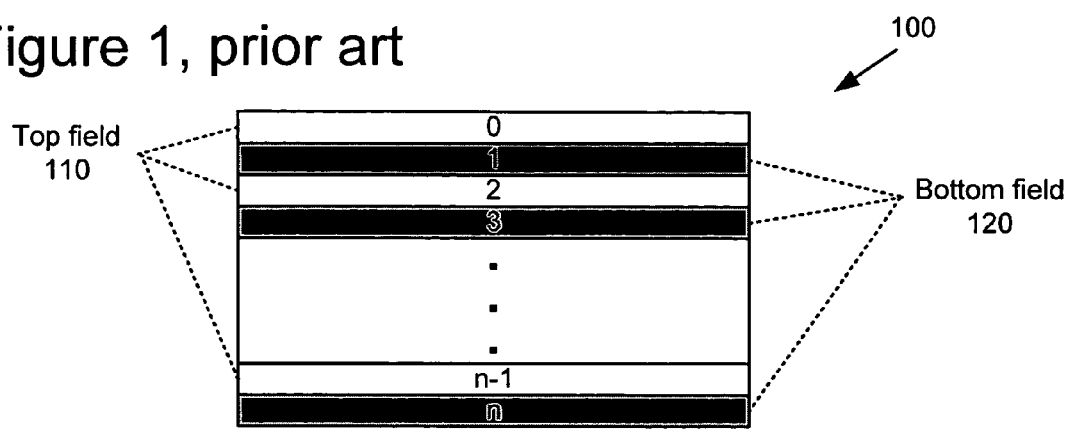
FIG. 1 is a block diagram of an interlaced video frame.

In the example video encoder 200 and decoder 300 described here, there are three distinct frames types: progressive, interlace frame and interlace field. Alternative video encoder and decoder implementations can support fewer or more picture types. Interlaced video content can be represented either in the interlaced frame format, or the interlaced field format. In the interlaced frame format, the video is represented as a sequence of picture frames in which the alternating scan lines of two successive fields are already combined. In other words, each picture of the video sequence is a frame with odd numbered scan lines taken from one field, and even scan lines taken from the next field, as illustrated in FIG. 1. In the interlaced field format, the video is represented as a sequence of pictures that are the (uncombined) alternating odd and even fields. In other words, the top and bottom fields are sent separately (as separate pictures) in the video sequence. The interlaced field format therefore is similar to the progressive mode, where the scan lines or rows are captured at the same time (without temporal displacement).

Figure 4:
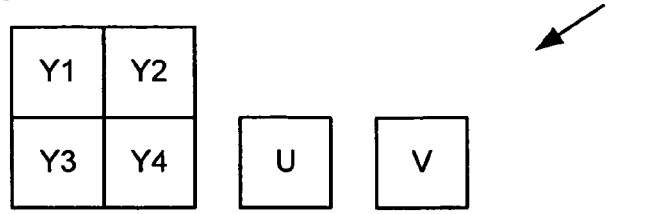
FIG. 4 is a block diagram of a macroblock structure used in the video encoder/decoder of FIGS. 2 and 3.

A progressive video frame is divided into macroblocks such as the macroblock 400 shown in FIG. 4. The macroblock 400 includes four 8×8 luminance blocks (Y1 through Y4) and two 8×8 chrominance blocks that are co-located with the four luminance blocks but half resolution horizontally and vertically, following the conventional 4:2:0 macroblock format. The vertical height of the macroblock then is 16 pixels. The 8×8 blocks may be further sub-divided at different stages, e.g., at the frequency transform (e.g., 8×4, ×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 5A:
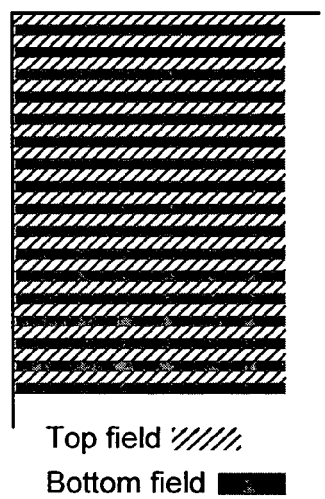
FIG. 5A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 5A shows part of an interlaced video frame 500, including the alternating lines of the top field and bottom field at the top left part of the interlaced video frame 500.

Figure 5B:
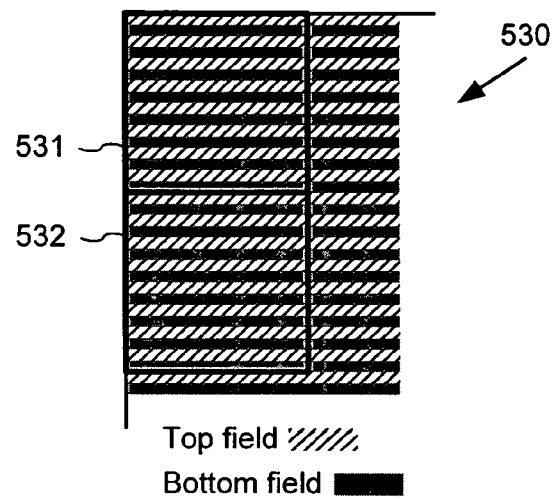
FIG. 5B is a diagram of the interlaced video frame organized for encoding/decoding as a frame.

FIG. 5B shows the interlaced video frame 500 of FIG. 5A organized for encoding/decoding as a frame 530. The interlaced video frame 500 has been partitioned into macroblocks such as the macroblocks 531 and 532, which use a 4:2:0 format as shown in FIG. 4. In the luminance plane, each macroblock 531, 532 includes 8 lines from the top field alternating with 8 lines from the bottom field for 16 lines total, and each line is 16 pixels long. (The actual organization and placement of luminance blocks and chrominance blocks within the macroblocks 531, 532 are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

Figure 5C:
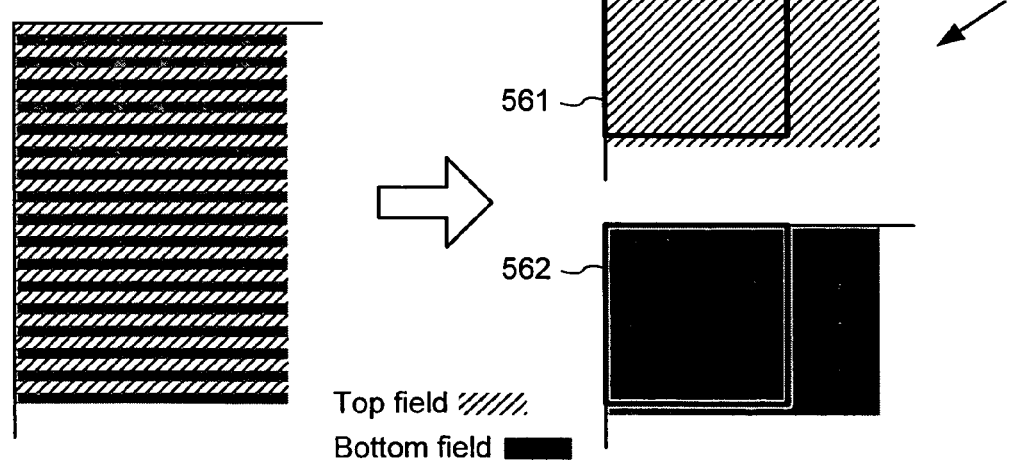
FIG. 5C is a diagram of the interlaced video frame organized for encoding/decoding as fields.

FIG. 5C shows the interlaced video frame 500 of FIG. 5A organized for encoding/decoding as fields 560. Each of the two fields of the interlaced video frame 500 is partitioned into macroblocks. The top field is partitioned into macroblocks such as the macroblock 561, and the bottom field is partitioned into macroblocks such as the macroblock 562. (Again, the macroblocks use a 4:2:0 format as shown in FIG. 4, and the organization and placement of luminance blocks and chrominance blocks within the macroblocks are not shown.) In the luminance plane, the macroblock 561 includes 16 lines from the top field and the macroblock 562 includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks. Interlaced BI-fields are a hybrid of interlaced I-fields and interlaced B-fields; they are intra-coded, but are not used as anchors for other fields.

Interlaced video frames organized for encoding/decoding as fields can include various combinations of different field types. For example, such a frame can have the same field type in both the top and bottom fields or different field types in each field. In one implementation, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

In the case of frames coded in the progressive or interlaced-frame modes, the frame is required to have a vertical size that is macroblock aligned, or in other words has an integral number of macroblocks. This restricts such frames to be a multiple of 16 pixels in height. In the case of frames coded in the interlaced-field mode, the frame is required to have a vertical size that is aligned with 2·N macroblocks, since each field is required to be an integral number of macroblocks in height. The interlaced-field mode frame is therefore restricted to being 32 pixels in height.

3. Bitstream Syntax

With reference to FIGS. 6-10, the compressed video bitstream 295 (FIG. 2) includes information for a sequence of compressed progressive, interlace frame or interlace field pictures. The bitstream is organized into several hierarchical layers that are decoded by a decoder such as the decoder (300) of FIG. 3. The highest layer is the sequence layer, which has information for the overall sequence of frames. Additionally, each compressed video frame is made up of data that is structured into three hierarchical layers: picture, macroblock, and block (from top to bottom). Alternative video implementations employing the variable coding resolution technique can utilize other syntax structures having various different compositions of syntax elements.

Further, the compressed video bit stream can contain one or more entry points. As discussed more fully in Holcomb et al., "Signaling Valid Entry Points In A Video Stream," U.S. patent application Ser. No. 10/882,739, filed Jun. 30, 2004 [hereafter the "Entry-Point patent application"], and claiming priority to U.S. Provisional Patent Application No. 60/520,543, filed Nov. 13, 2003, the disclosures of which are hereby incorporated herein by reference, valid entry points in a bitstream are locations in an elementary bitstream from which a system (e.g., a receiver, a video splicer, a commercial insertion tool, a video editor, a summarization engine, etc.) can decode or process the bitstream without the need of any preceding information (bits) in the bitstream. Frames that can be decoded without reference to preceding frames are typically referred to as "key" frames.

An entry point is signaled in a bitstream by an entry point indicator. The purpose of an entry point indicator is to signal the presence of a special location in a bitstream to begin or resume decoding (e.g., where there is no dependency on past decoded video fields or frames to decode the video frame following immediately the entry point indicator). Entry point indicators can be inserted at regular or irregular intervals in a bitstream. Therefore, an encoder can adopt different policies to govern the insertion of entry point indicators in a bitstream.

The video codec supports various compression profiles, including a simple, main and advanced profile. The advanced profile of the video codec syntax supports encoding mixed interlaced and progressive content (i.e., hybrid) video sequences.

Figure 6:
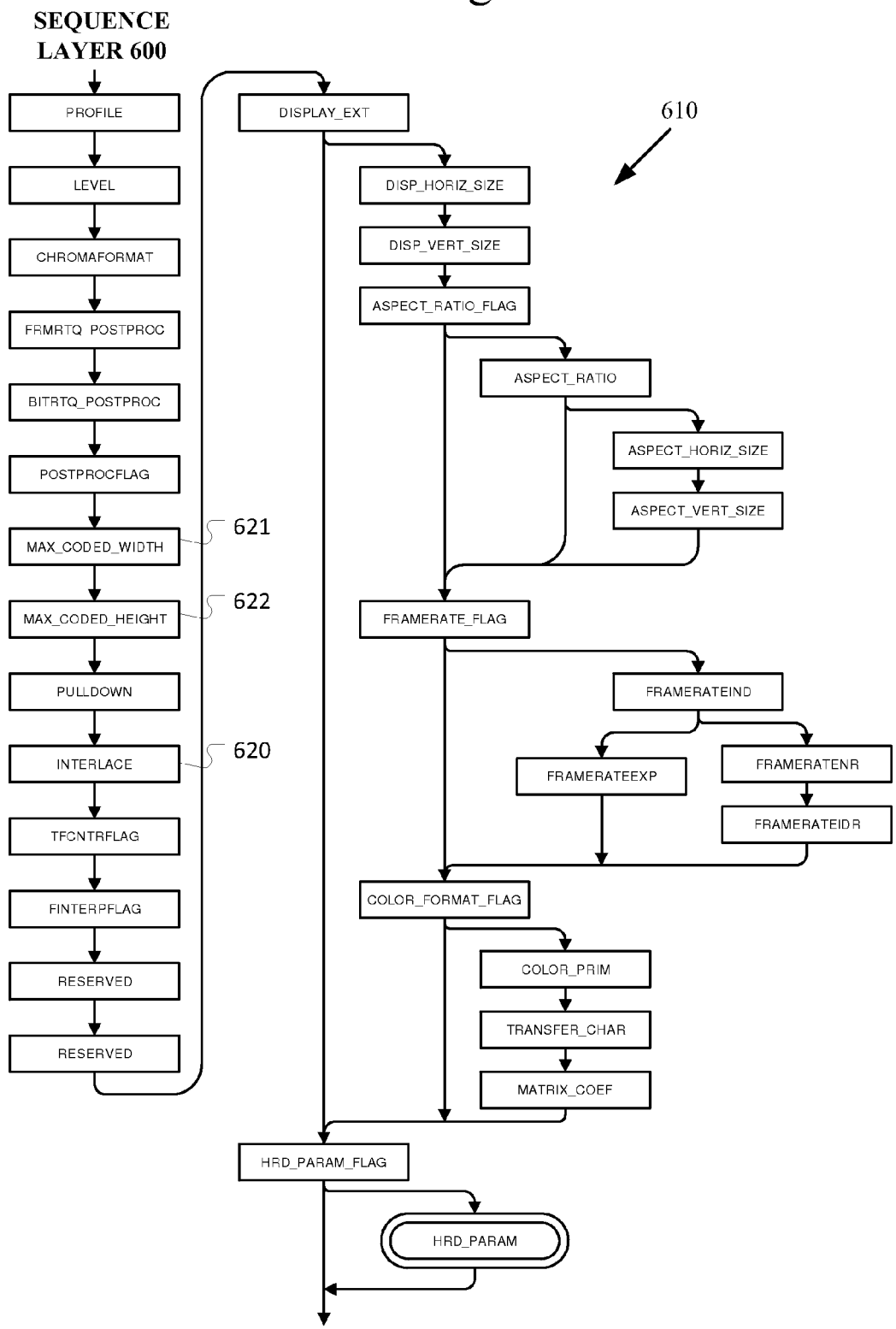
FIG. 6 is a syntax diagram of a sequence header in accordance with a coding syntax of the compressed bitstream utilized by the video encoder/decoder of FIGS. 2 and 3.
Figure 8:
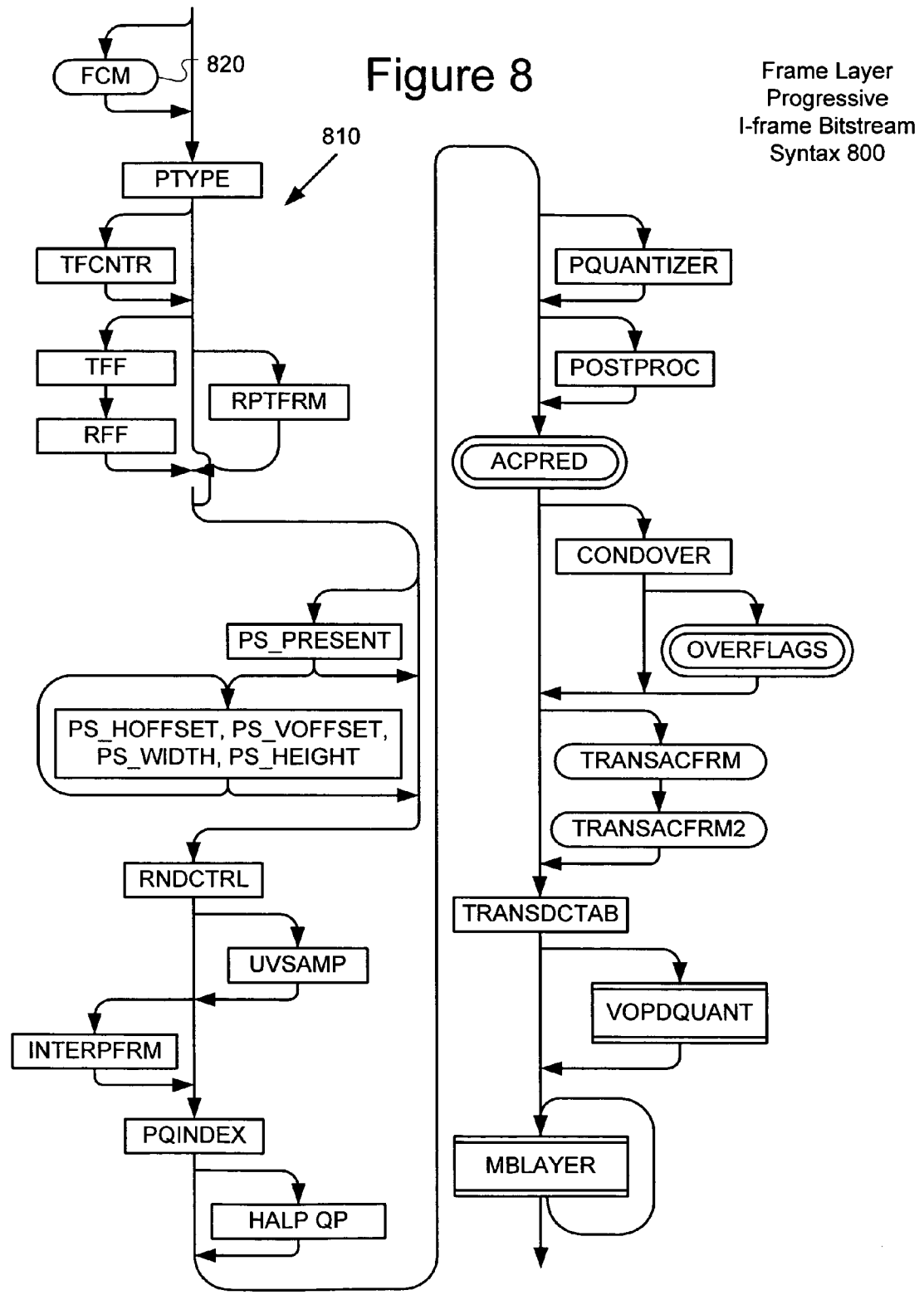
FIG. 8 is a syntax diagram of a progressive mode picture header in accordance with a coding syntax of the compressed bitstream utilized by the video encoder/decoder of FIGS. 2 and 3.

FIG. 6 is a syntax diagram for the sequence layer 600, which includes a sequence header 610 followed by data for the picture layer 800 (see FIG. 8). The sequence header 610 includes several sequence-level elements that are processed by the decoder and used to decode the sequence. The elements that make up the sequence header 610 include an interlace content (INTERLACE) element 620, a maximum coded width (MAX_CODED_WIDTH) element 621, and a maximum coded height (MAX_CODED_HEIGHT) element 622, among others.

The INTERLACE element is a 1-bit syntax element. A value of zero (INTERLACE=0) signals that the source content for the sequence is entirely progressive. A value of one (INTERLACE=1) signals that the source content includes interlaced frames. The individual frames may still be coded using the progressive or interlace syntax when INTERLACE=1.

The MAX_CODED_WIDTH element 621 specifies the maximum horizontal size of the coded picture within the sequence. In the illustrated implementation, this syntax element is a 12-bit binary encoding of sizes. The maximum horizontal size of the picture is equal to the value of this field multipled by 2, plus 2. The horizontal size of the coded pictures in the video sequence may change at an entry point but is always less than, or equal to, MAX_CODED_WIDTH. Alternative implementations can utilize a maximum coded width syntax element having a different size and/or specifying the maximum horizontal size in a different way.

The MAX_CODED_HEIGHT element 622 specifies the maximum vertical size of the coded picture within the video sequence. In the illustrated implementation, this syntax element is a 12-bit binary encoding of sizes. The maximum vertical size of the picture is equal to the value of this field multipled by 2, plus 2. The vertical size of the coded pictures in the video sequence may change at an entry point but is always less than, or equal to, MAX_CODED_HEIGHT. Alternative implementations can utilize a maximum coded height syntax element having a different size and/or specifying the maximum vertical size in a different way.

Figure 7:
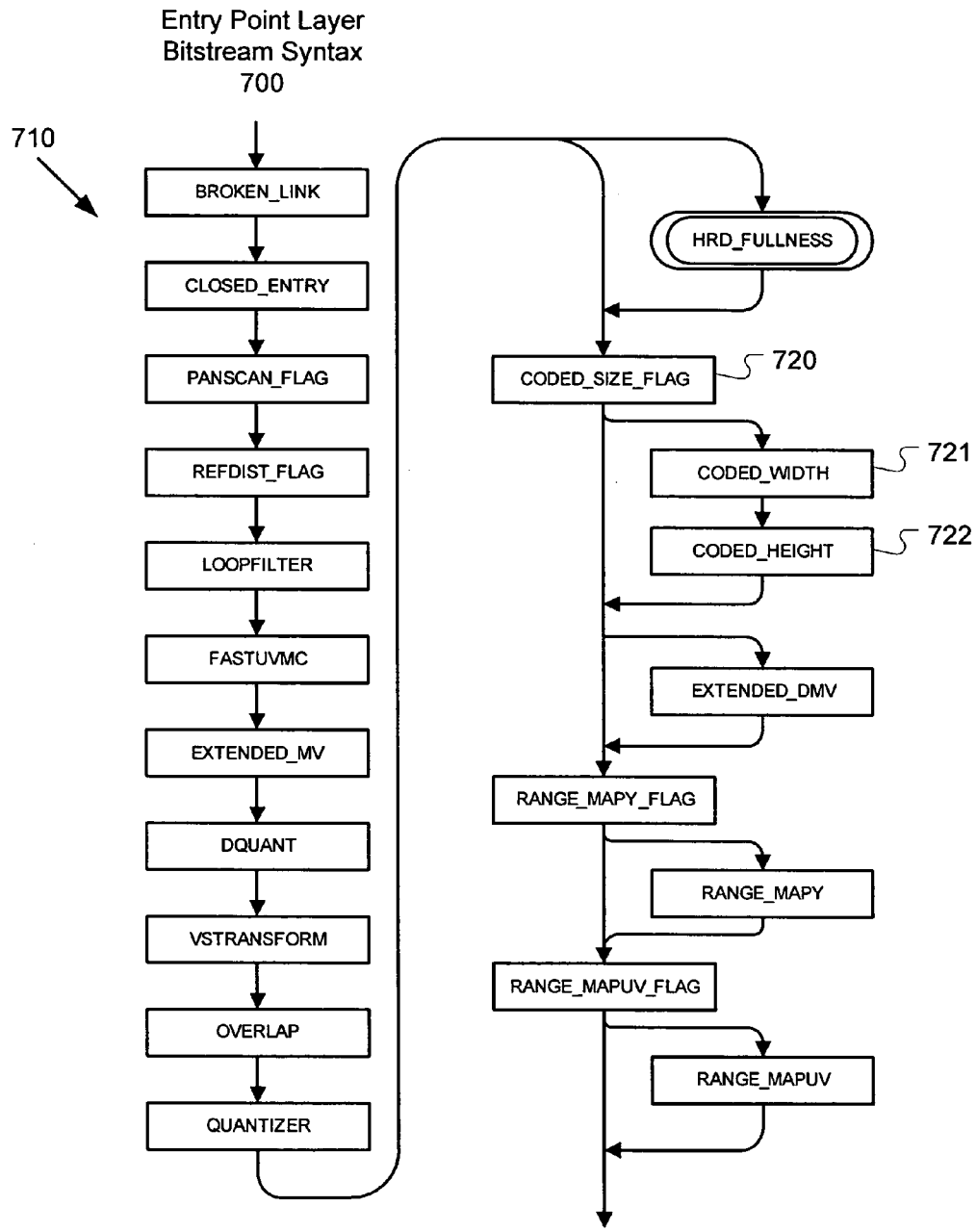
FIG. 7 is a syntax diagram of an entry point header in accordance with a coding syntax of the compressed bitstream utilized by the video encoder/decoder of FIGS. 2 and 3.

FIG. 7 is a syntax diagram for the entry point layer 700. The entry point layer 700 includes an entry point header 710 followed by data for a group of pictures forming an entry point segment. The entry point header 710 includes several entry point-level elements that are processed by the decoder and used to decode the following picture frames without reference to preceding picture data in the video sequence. The elements that make up the entry point header include a coded size flag (CODED_SIZE_FLAG) element 720, a coded width (CODED_WIDTH) element 721, and a coded height (CODED_HEIGHT) element 722, among others.

The CODED_SIZE_FLAG signals a different coded resolution for pictures in the entry point segment. In the illustrated implementation, the CODED_SIZE_FLAG element 720 is a 1-bit syntax element. A value of one (CODED_SIZE_FLAG=1) indicates that the CODED_WIDTH and CODED_HEIGHT syntax elements are also present in the entry header. Otherwise, a flag value of zero (CODED_SIZE_FLAG=0) indicates that the CODED_WIDTH and CODED_HEIGHT syntax elements are not present in the entry header; and the width and height of the frames within the entry point segment are specified by the MAX_CODED_WIDTH and MAX_CODED_HEIGHT syntax elements in the sequence header. Alternative implementations can utilize a different format flag or value to signal a group of pictures in the video sequence has a different coded size.

The CODED_WIDTH element 721 specifies the coded horizontal size of pictures in the entry point segment. In the illustrated implementation, the CODED_WIDTH element 721 is a 12 bit syntax element that is present if CODED_SIZE_FLAG=1. It specifies the coded width of the frames within the entry point segment in units of 2 pixels. The coded width of the frames within the entry point segment is equal to the value of this field multiplied by 2, plus 2. Therefore, the range is 2 to 8192. Alternative implementations can use a different syntax element format to signal the coded horizontal picture size.

Similarly, the CODED_HEIGHT element 722 specifies the coded vertical size of pictures in the entry point segment. The CODED_HEIGHT element is a 12 bit syntax element that is present if CODED_SIZE_FLAG=1. It specifies the coded height of the frames within the entry point segment in units of 2 pixels. The coded height of the frames within the entry point segment is equal to the value of this field multiplied by 2, plus 2. Therefore, the range is 2 to 8192. Alternative implementations can use a different syntax element format to signal the coded vertical picture size.

Figure 9:
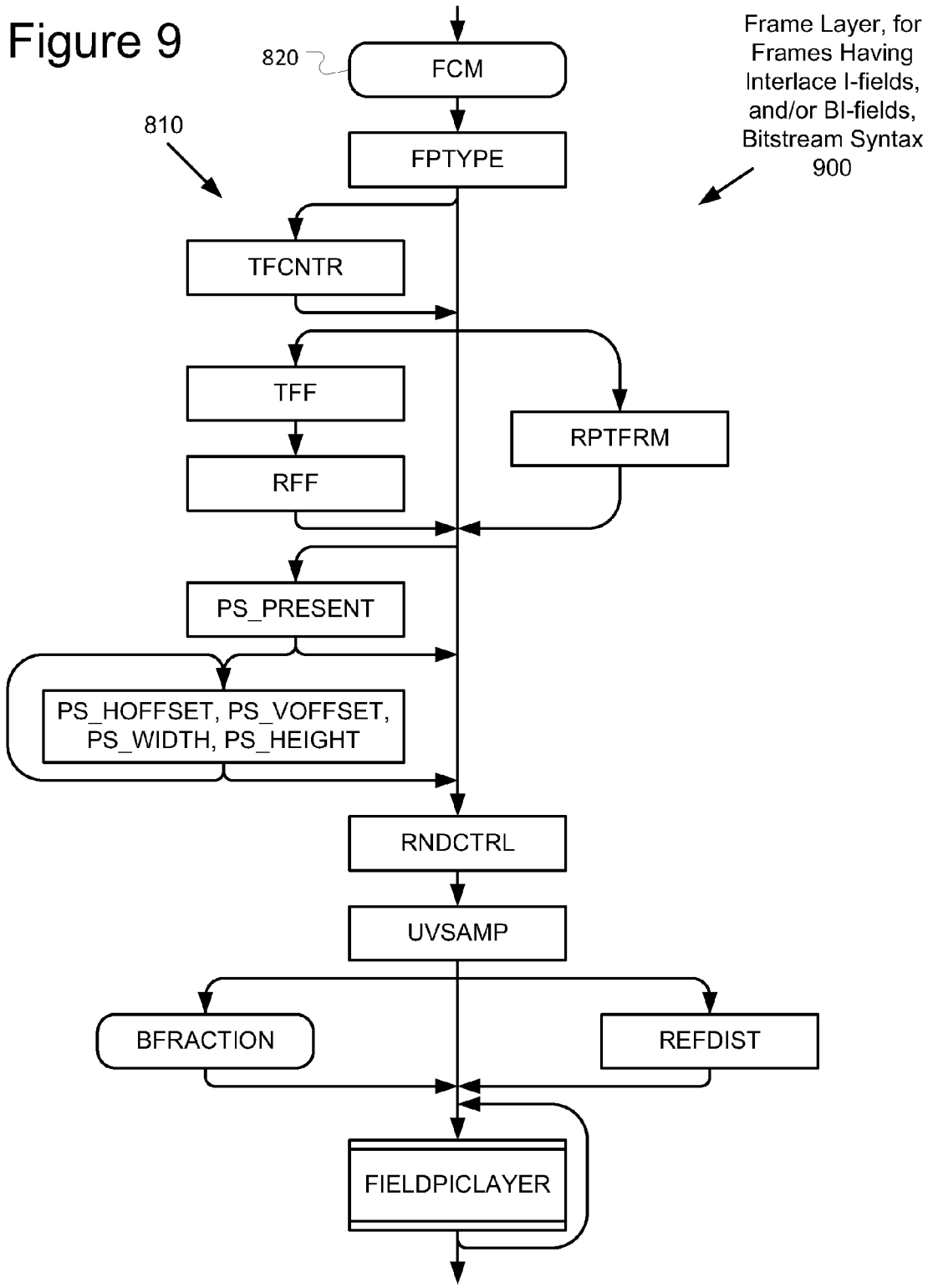
FIG. 9 is a syntax diagram of an interlaced field mode picture header in accordance with a coding syntax of the compressed bitstream utilized by the video encoder/decoder of FIGS. 2 and 3.
Figure 10:
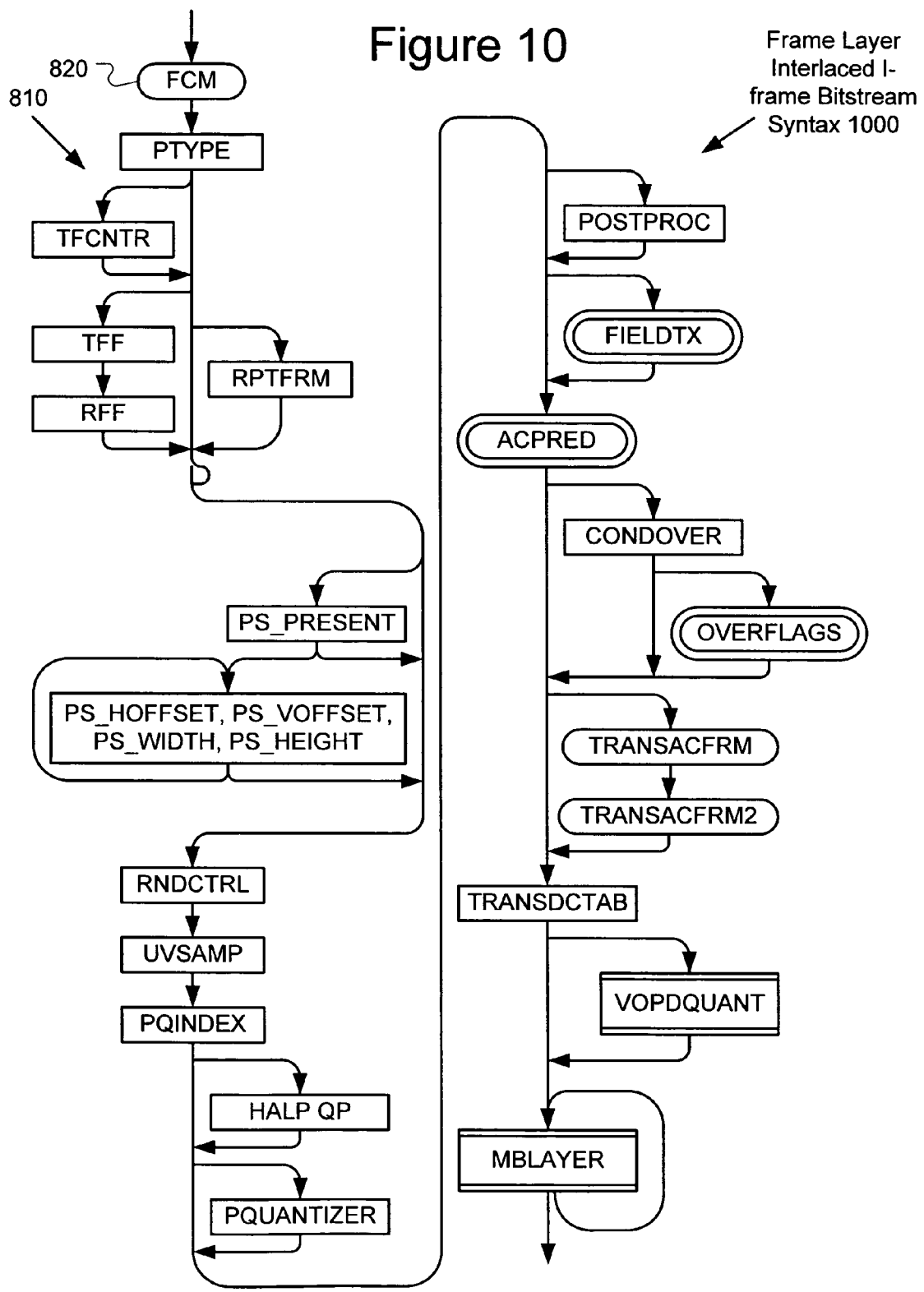
FIG. 10 is a syntax diagram of an interlaced frame mode picture header in accordance with a coding syntax of the compressed bitstream utilized by the video encoder/decoder of FIGS. 2 and 3.

FIGS. 8-10 are syntax diagrams for the picture layer 800 for a frame in progressive, interlaced field and interlaced frame modes, respectively. The picture layer includes a picture header 810 followed by data for the macroblock layer. The picture header includes several picture-level elements that are processed by the decoder and used to decode each picture. The elements that make up the picture header include a picture coding type (FCM) element 820, among others. The syntax of the picture layer for predictive-coded frames differ in various details, but similarly include the picture coding type element.

The FCM element is present only if the sequence level syntax element INTERLACE has the value 1, and it indicates whether the picture is coded as progressive, interlace-field or interlace-frame. Table 1 shows the VLC codewords used to indicate the picture coding type. In the illustrated video codec, B pictures are constrained to be the same type (i.e., progressive, field-interlace or frame-interlace) as the first anchor frame that comes after them, i.e. all B pictures shall be of the same picture coding type as the backward reference picture of that B picture.

TABLE 1

| Picture Coding Type VLC | |
| --- | --- |
| FCM | Picture Coding Type |
| 0 | Progressive |
| 10 | Frame-Interlace |
| 11 | Field-Interlace |

4. Adaptive Vertical Macroblock Alignment

Figure 13A:
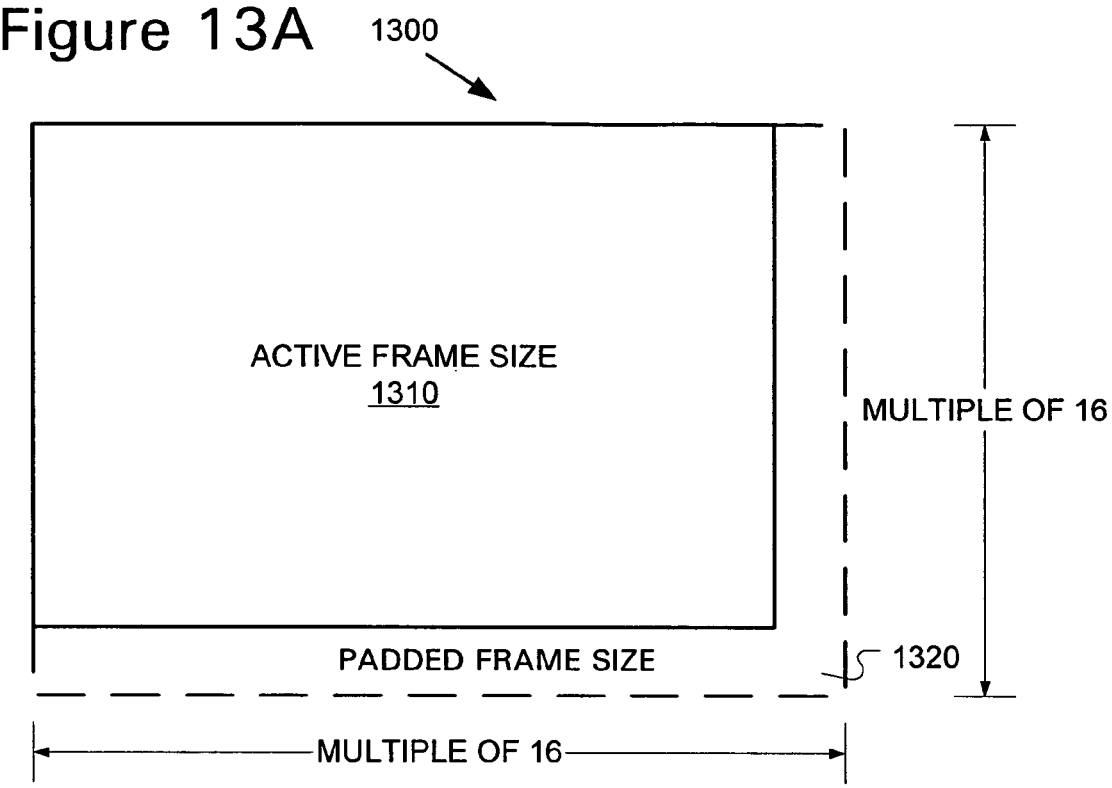
FIGS. 13A-B are diagrams of applying repeat padding and adaptive vertical macroblock alignment to progressive and interlaced pictures of a hybrid video sequence.
Figure 13B:
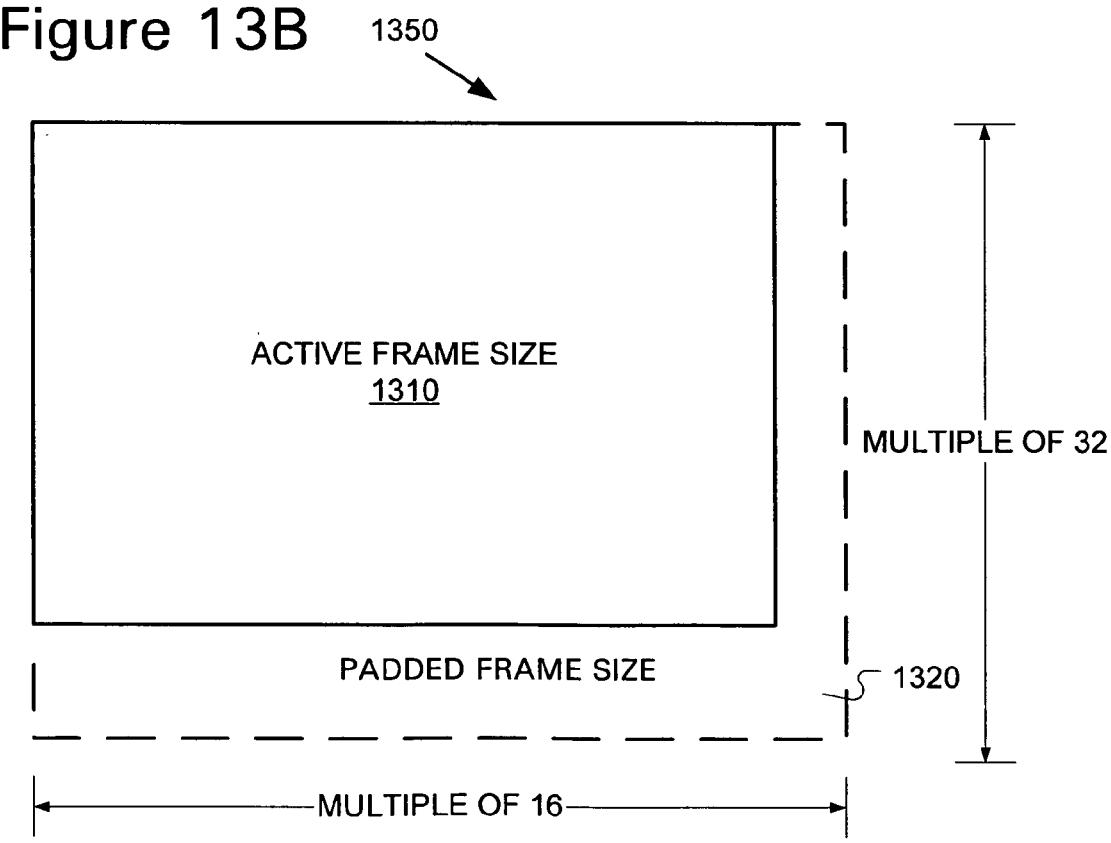

The video encoder 200 (FIG. 2) and decoder 300 (FIG. 3) provide for adaptive vertical macroblock alignment of mixed mode (or hybrid) video sequences, by enforcing vertical macroblock alignment restrictions on a per frame basis rather than imposing a uniform vertical macroblock alignment restriction across the entire video sequence. FIGS. 13A-B illustrate the different macroblock alignment restrictions for progressive and interlace content pictures. For pictures 1300 (FIG. 13A) in the video sequence coded in progressive mode, the video codec enforces a vertical macroblock alignment restriction of a multiple of 16 pixels. For interlaced field and interlaced frame mode pictures 1350 (FIG. 13B), the video codec enforces a height restriction to a multiple of 32 pixels. The horizontal alignment requirement is a multiple of 16 pixels. In alternative video codec implementations the height restriction for these modes can vary, such as due to use of a different macroblock size.

In a mixed frame (or hybrid) coding sequence, each frame can be encoded as one of progressive, interlaced frame or interlaced field types. By enforcing the height alignment restriction on a frame level, the video codec can achieve significant savings on padding operations relative to a design which requires all frames in a sequence to have the same height. This is because the video codec potentially can avoid padding progressive and interlace frame type pictures to the larger alignment requirement of interlaced pictures, reducing the padding required for such frames.

Figure 11:
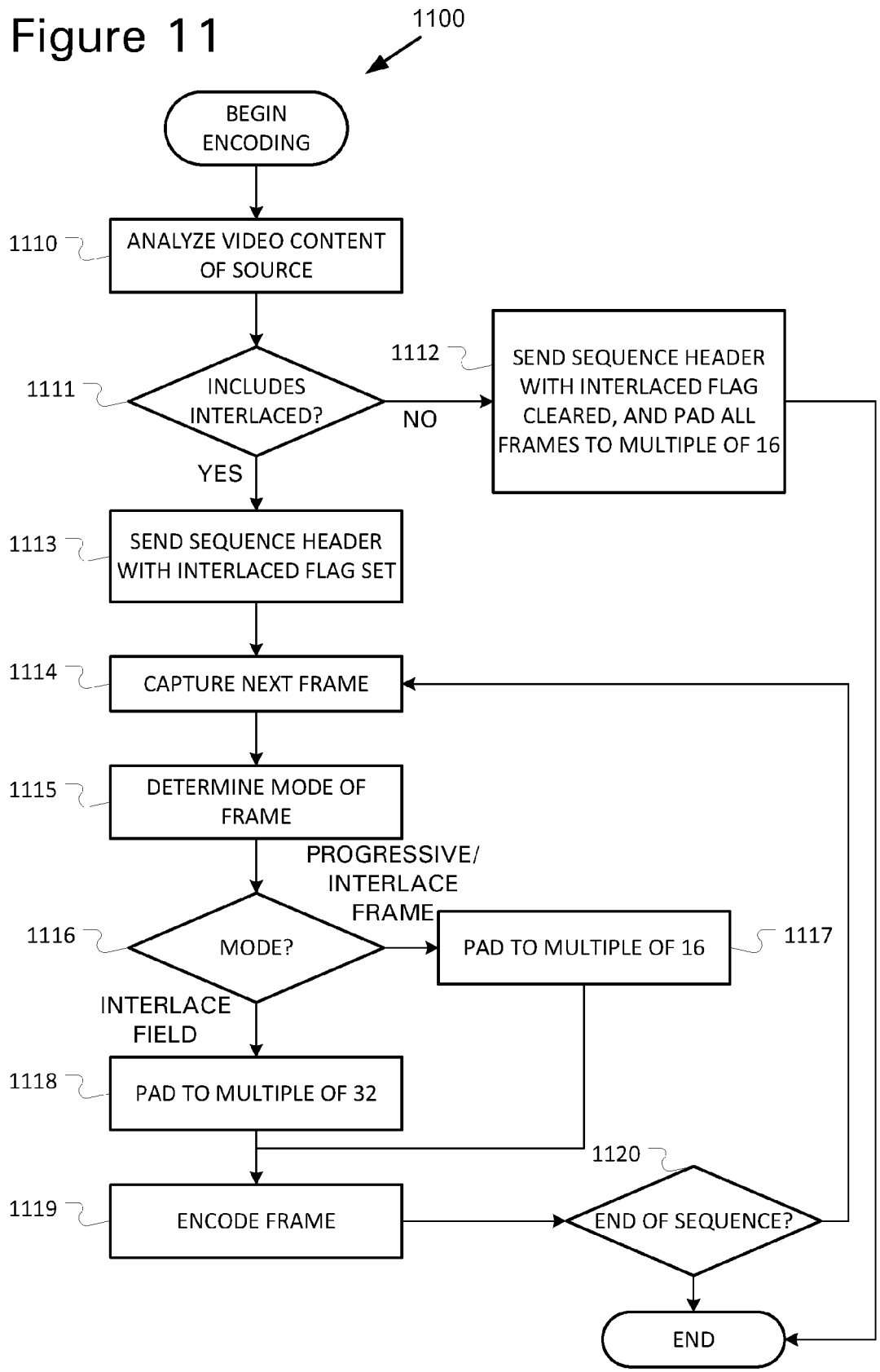
FIG. 11 is a flow diagram of a method utilized in the encoder of FIG. 2 for encoding a hybrid video sequence using adaptive vertical macroblock alignment.

With reference now to FIG. 11, the video encoder 200 (FIG. 2) performs operations for an adaptive vertical macroblock alignment encoding process 1100 when encoding a mixed video sequence. The diagram is simplified to illustrate the encoding operations relating to adaptive vertical macroblock alignment. It should be apparent to those skilled in the art that the encoding of the video sequence involves many more operations (not otherwise related to adaptive vertical macroblock alignment) as summarized above in the description of the encoder 200 in FIG. 2. Alternative implementations of the video encoder can perform the adaptive vertical macroblock alignment using fewer, more or a different arrangement of operations.

The video encoder begins this process by analyzing the video content of the sequence to determine whether any frames of the sequence have interlaced content at operation 1110. If all frames have progressive content at operations 1111-1112, the video encoder sends the sequence header for the sequence with the INTERLACE flag element 620 (FIG. 6) cleared. The video encoder then pads all pictures of the sequence to have a vertical macroblock alignment that is a multiple of 16 pixels. If any frames have interlaced content, the video encoder sends the sequence header with the interlaced content flag set, which indicates at least one frame is encoded as an interlaced field or interlaced frame type at operation 1113.

The video encoder then acquires the next picture of the video sequence from the video source at operation 1114, and determines the coding mode of the frame (whether progressive, interlaced frame or interlaced field) at operation 1115. Based on the mode, the video encoder enforces the appropriate vertical macroblock alignment restriction by padding (as necessary) to a multiple of 16 pixels for progressive and interlaced frame type pictures at operation 1117, or padding (as necessary) to a multiple of 32 pixels for interlaced field pictures. The video encoder pads by repeating the last row of the actual video content of the picture (for progressive pictures) or the last two rows (for interlaced video content) to fill the picture out vertically to the next proximate macroblock alignment. The video encoder encodes the frame as the appropriate type at operation 1119. The video encoder finally checks whether the video sequence is to end at the current frame (e.g., based on user input) at operation 1120. If so, the video encoder ends encoding of the sequence. Otherwise, the video encoder returns to acquiring a next picture of the sequence at operation 1114.

Figure 12:
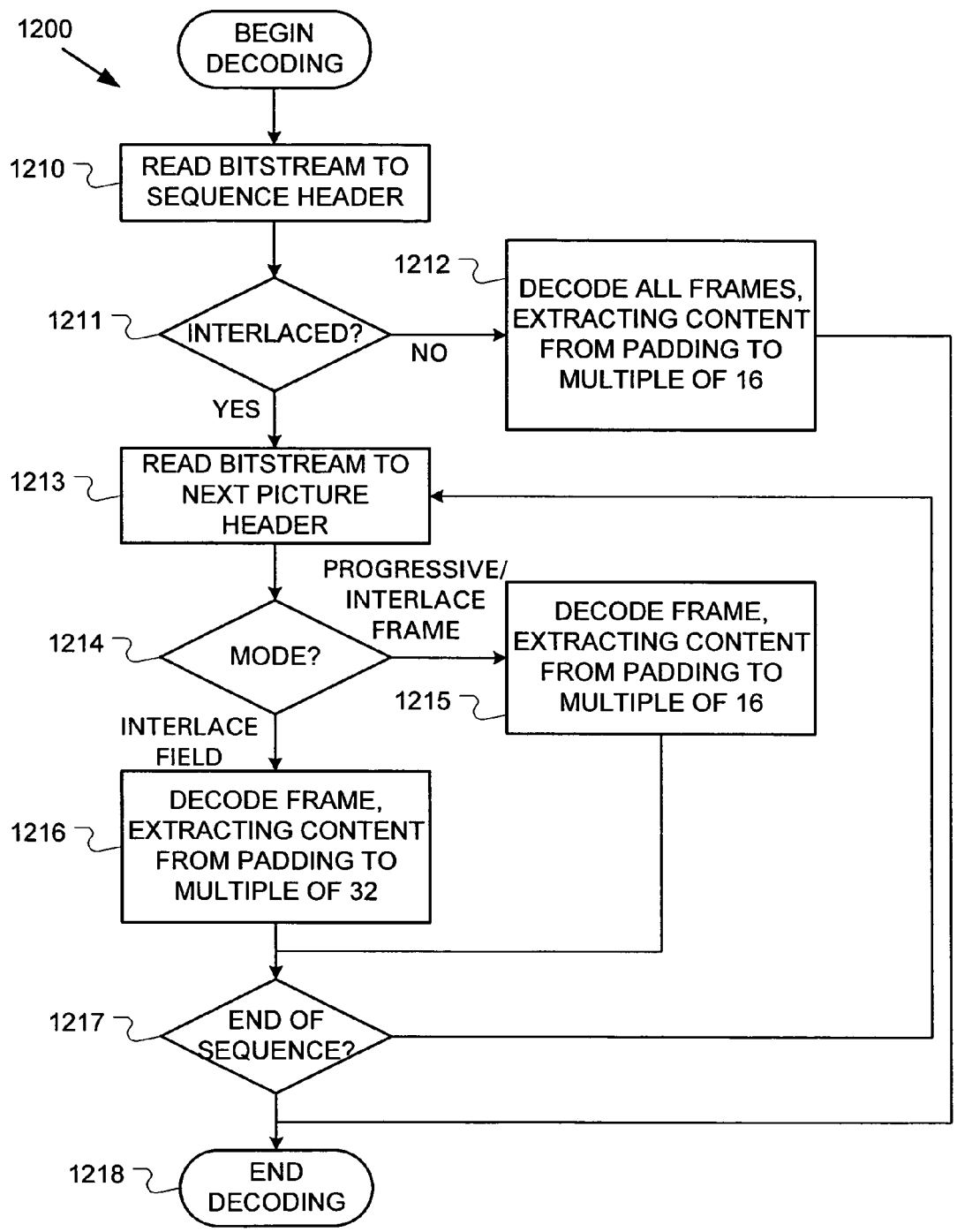
FIG. 12 is a flow diagram of a method utilized in the decoder of FIG. 3 for decoding a hybrid video sequence using adaptive vertical macroblock alignment.

FIG. 12 illustrates operations performed by the video decoder for an adaptive vertical macroblock alignment decoding process 1200 when decoding a mixed video sequence. The diagram is simplified to illustrate the decoding operations relating to adaptive vertical macroblock alignment. It should be apparent to those skilled in the art that the decoding of the video sequence involves many more operations (not otherwise related to adaptive vertical macroblock alignment) as summarized above in the description of the decoder 300 in FIG. 3. Alternative implementations of the video decoder can perform the adaptive vertical macroblock alignment using fewer, more or a different arrangement of operations.

The video decoder begins the decoding by reading the compressed bit stream to the location of the sequence header at operation 1210. The video decoder checks the INTERLACE flag element 620 (FIG. 6) in the sequence header at operation 1211. If this flag is not set (indicating all progressive type frames), the video decoder decodes all frames, including extracting the video content of each frame's picture excluding the padding added to achieve vertical macroblock alignment at a multiple of 16 pixels.

If the interlaced content flag is set, the video decoder instead proceeds to read the picture header of the next frame at operation 1213. Depending on the picture type specified in the picture coding type (PCM) element 820 (FIG. 8) of the picture header, the video decoder determines the amount of padding that was used to achieve vertical macroblock alignment.

With reference to FIG. 15, the decoder calculates the padded region of the picture based on the CODED_WIDTH and CODED_HEIGHT elements 721, 722 (FIG. 7) specified in the picture header for the frame (or MAX_CODED_WIDTH and MAX_CODED_HEIGHT elements 621, 622 in the sequence header 610 shown in FIG. 6, if no lower coded resolution is specified for the picture), and the frame type (FCM) element 820 in the picture header. The coded resolution values indicate the active frame size 1310 (FIGS. 13A-B) of the picture. Based on the active frame size dimensions and picture type, the decoder calculates the padded frame size 1320 (FIGS. 13A-B) for the frame type (progressive or interlaced) of the picture as shown in the pseudo-code listing 1500 in FIG. 15. For progressive pictures, the horizontal and vertical padded frame dimensions are the next multiple of 16 that is larger than the active frame dimensions. For interlaced pictures, the vertical padded frame size is the next multiple of 32 larger than the active frame height, whereas the padded frame width is the next multiple of 16 larger than the active frame width.

With reference again to FIG. 12, the video decoder then extracts the video content excluding the appropriate amount of padding for the picture type at operations 1215, 1216. However, the decoder may use the decoded padding region of the picture for decoding a subsequent P-Frame or B-Frame (which may have a macroblock or macroblocks with a motion vector pointing to the padding region of a preceding I-Frame).

The video decoder then checks whether the video sequence is ended at operation 1217. If so, the video decoder ends the adaptive vertical macroblock alignment process 1200 at operation 1218. Otherwise, the video decoder returns to decode the next picture header at operation 1213.

5. Efficient Repeat Padding of Hybrid Video Sequences

Figure 14A:
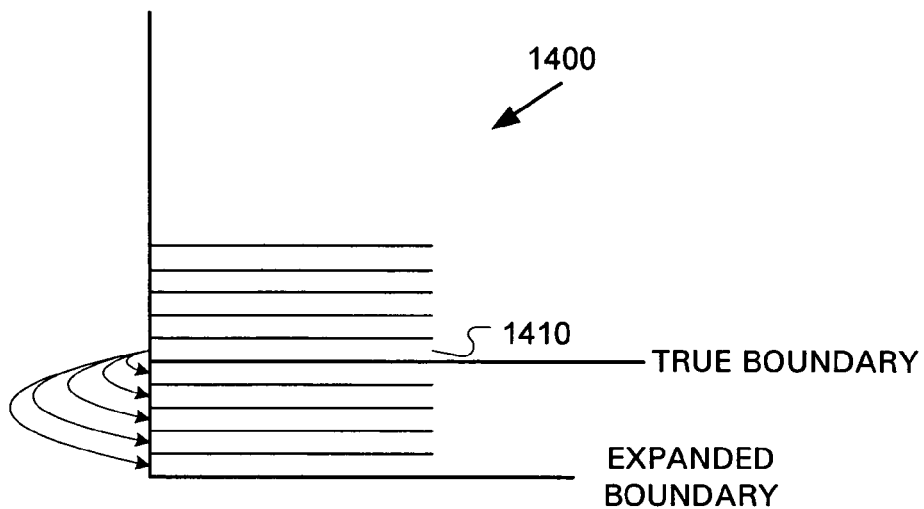
FIGS. 14A-B are diagrams showing repeat padding of progressive and interlaced-type pictures of a hybrid video sequence.
Figure 14B:
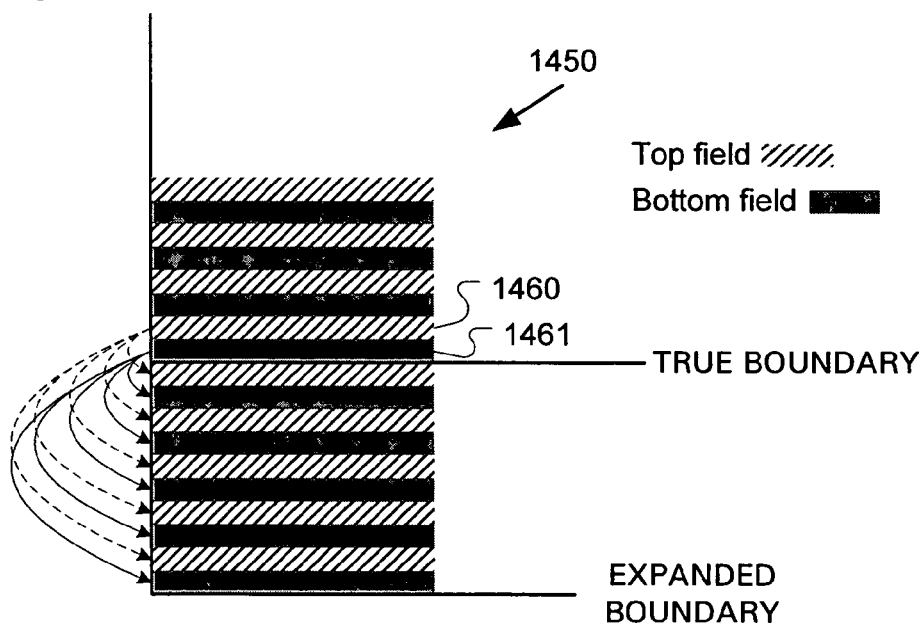

With reference now to FIGS. 14A-B, the repeat padding performed by the video encoder (in operations 1117 and 1118 of the adaptive vertical macroblock alignment process 1100 in FIG. 11) also differs by frame type. For progressive type pictures 1400, the video encoder 200 (FIG. 2) repeats the last row (horizontal boundary or edge) 1410 of the active content in the frame to pad the frame out to the macroblock alignment (i.e., the next multiple of 16). For interlaced (both interlaced field- and interlaced frame-type) pictures 1450, the video encoder repeats the last row of each field of the active content (i.e., the last two rows 1460, 1461 of the active content) to pad the frame out to the macroblock alignment, which is the next multiple of 32 for interlaced field or multiple of 16 for interlaced frame mode pictures. For both progressive and interlaced pictures, the video encoder pads the picture horizontally by repeating the right vertical edge of the active content out to the padded picture size (i.e., the next multiple of 16 for both progressive and interlaced types).

In addition, each picture used as a reference frame for predictive coding is further repeat padded to expand the picture area for purposes of motion estimation and prediction for subsequent predicted (P- and B-) frames. This repeat padding for prediction also differs by frame type. For progressive type pictures, the video encoder 200 (and video decoder at decoding) repeats the last row (horizontal boundary or edge) 1410 of the active content in the frame to an expanded motion estimation region. The first row also is repeated vertically upward to provide an expanded motion estimation region above the picture. For interlaced (both interlaced field- and interlaced frame-type) pictures 1450, the video encoder (and video decoder at decoding) repeats the last row of each field of the active content (i.e., the last two rows 1460, 1461 of the active content) to pad the frame out to the expanded motion estimation region. Similarly, the first two rows are repeat vertically upward to provide expanded motion estimation above the picture. The left and right edges of the coded picture are repeated to expand motion estimation respectively left and right horizontally on both progressive and interlaced pictures. In the illustrated implementation, the expanded motion estimation region for progressive pictures extends 32 pixels horizontally and vertically from the macroblock aligned frame size, and extends 38 pixels horizontally and vertically from the macroblock aligned frame size of interlaced (both frame and field-types) pictures. This expanded motion estimation region is not part of the picture encoded into the compressed bit stream, but simply used as the basis of motion estimation and prediction for coding of the subsequent predicted (P- or B-) frame.

6. Computing Environment

The above described implementations of the repeat padding for hybrid video sequences can be performed on any of a variety of devices in which image and video signal processing is performed, including among other examples, computers; image and video recording, transmission and receiving equipment; portable video players; video conferencing; Web video streaming applications; and etc. The image and video coding techniques can be implemented in hardware circuitry (e.g., in circuitry of an ASIC, FPGA, etc.), as well as in image and video processing software executing within a computer or other computing environment (whether executed on the central processing unit (CPU), or dedicated graphics processor, video card or like), such as shown in FIG. 16.

Figure 16:
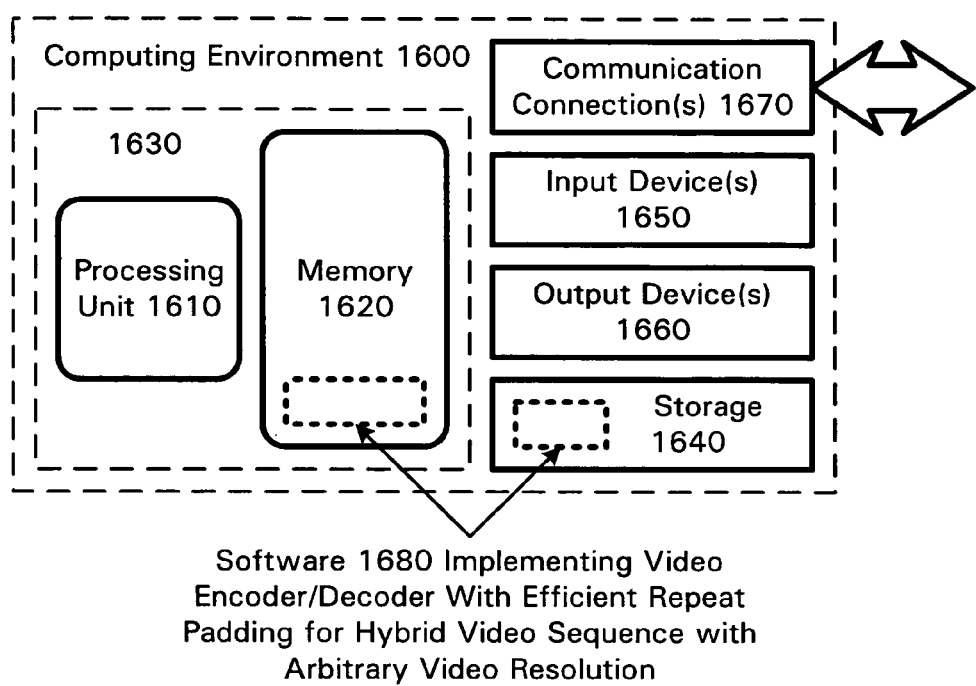
FIG. 16 is a block diagram of a suitable computing environment for the video encoder/decoder of FIGS. 2 and 3.

FIG. 16 illustrates a generalized example of a suitable computing environment (1600) in which the described repeat padding for hybrid video sequences may be implemented. The computing environment (1600) is not intended to suggest any limitation as to scope of use or functionality of the invention, as the present invention may be implemented in diverse general-purpose or special-purpose computing environments.

With reference to FIG. 16, the computing environment (1600) includes at least one processing unit (1610) and memory (1620). In FIG. 16, this most basic configuration (1630) is included within a dashed line. The processing unit (1610) executes computer-executable instructions and may be a real or a virtual processor. In a multi-processing system, multiple processing units execute computer-executable instructions to increase processing power. The memory (1620) may be volatile memory (e.g., registers, cache, RAM), non-volatile memory (e.g., ROM, EEPROM, flash memory, etc.), or some combination of the two. The memory (1620) stores software (1680) implementing the described repeat padding for hybrid video sequences.

A computing environment may have additional features. For example, the computing environment (1600) includes storage (1640), one or more input devices (1650), one or more output devices (1660), and one or more communication connections (1670). An interconnection mechanism (not shown) such as a bus, controller, or network interconnects the components of the computing environment (1600). Typically, operating system software (not shown) provides an operating environment for other software executing in the computing environment (1600), and coordinates activities of the components of the computing environment (1600).

The storage (1640) may be removable or non-removable, and includes magnetic disks, magnetic tapes or cassettes, CD-ROMs, CD-RWs, DVDs, or any other medium which can be used to store information and which can be accessed within the computing environment (1600). The storage (1640) stores instructions for the software (1680) implementing the audio encoder that performs the repeat padding for hybrid video sequences.

The input device(s) (1650) may be a touch input device such as a keyboard, mouse, pen, or trackball, a voice input device, a scanning device, or another device that provides input to the computing environment (1600). For audio, the input device(s) (1650) may be a sound card or similar device that accepts audio input in analog or digital form, or a CD-ROM reader that provides audio samples to the computing environment. The output device(s) (1660) may be a display, printer, speaker, CD-writer, or another device that provides output from the computing environment (1600).

The communication connection(s) (1670) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The repeat padding for hybrid video sequences herein can be described in the general context of computer-readable media. Computer-readable media are any available media that can be accessed within a computing environment. By way of example, and not limitation, with the computing environment (1600), computer-readable media include memory (1620), storage (1640), and combinations of any of the above.

The repeat padding for hybrid video sequences herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of repeat padding for hybrid video sequences by a video codec device having a processor and a memory, comprising:
    with the video codec device, encoding a hybrid video sequence having plural frames, the plural frames of the video sequence including both progressive frames and interlaced frames, wherein the encoding the hybrid video sequence includes:
        setting a maximum coded width and maximum coded height for the video sequence;
        for an entry point segment, determining whether to signal coded width and coded height for the entry point segment apart from signaling of the maximum coded width and the maximum coded height, respectively, for the video sequence and, if so, setting the coded width and the coded height for the entry point segment;
        determining an active content frame size for a first frame, wherein the active content frame size is a resolution in terms of pixels, wherein the active content frame size of the first frame is indicated by the coded width and the coded height for the entry point segment if the coded width and the coded height for the entry point segment are set, and otherwise the active content frame size is indicated by the maximum coded width and the maximum coded height for the video sequence;
        encoding and decoding the first frame, the first frame having a macroblock-aligned vertical size that depends at least in part on frame coding mode of the first frame, wherein the decoded first frame is used as a reference frame;
        if the reference frame was coded as a frame of progressive video, expanding from the active content frame size of the reference frame using a first form of repeat padding, wherein the first form of repeat padding includes repeating a last row of active content of the reference frame, the active content being pixels in an area defined by the active content frame size;
        if the reference frame was coded as separate fields of interlaced video or frame of interlaced video, expanding from the active content frame size of the reference frame using a second form of repeat padding, wherein the second form of repeat padding includes repeating a last row of each field of the active content of the reference frame; and
        for a second frame of plural frames of the entry point segment, setting a frame coding mode that indicates whether the second frame is coded as a frame of progressive video, coded as separate fields of interlaced video or coded as a frame of interlaced video, and encoding the second frame using motion compensation relative to the reference frame; and
    outputting, from the video codec device, encoded data for the video sequence in an output bitstream.

2. The method of claim 1, wherein the expanding using the first form of repeat padding comprises:
    for each row in a padded region after the active content of the reference frame, repeating the last row of the active content.

3. The method of claim 2, wherein the expanding using the second form of repeat padding comprises:
    for rows in a padded region after the active content of the reference frame, repeating the last two rows of the active content, the last two rows including the last row of each field of the active content.

4. The method of claim 1, wherein the expanding using the second form of repeat padding comprises:
    for rows in a padded region after active content of the reference frame, repeating the last two rows of the active content, the last two rows including the last row of each field of the active content.

5. The method of claim 1, wherein the expanding using the first form of repeat padding comprises:
    for each row after the active content of the reference frame up to a first macroblock alignment restriction which is a multiple of the macroblock height, repeating the last row of the active content.

6. The method of claim 5, wherein the macroblock height is 16 pixels.

7. The method of claim 5, wherein the expanding using the second form of repeat padding comprises:
    for rows after the active content of the reference frame up to a second macroblock alignment restriction which is a multiple of twice the macroblock height, repeating the last two rows of the active content, the last two rows including the last row of each field of the active content.

8. The method of claim 7, wherein the macroblock height is 16 pixels.

9. A method of padding for hybrid video sequences in a video codec, comprising:
    with the video codec, determining a picture type of a frame in an entry point segment of a hybrid video sequence comprising progressive frames and interlaced frames, wherein the determining the picture type is based at least in part upon a frame coding mode for the frame;
    with the video codec, determining an active content frame size for the frame, wherein the active content frame size is a resolution in terms of pixels, wherein the active content frame size of the frame is indicated by a coded width and a coded height for the entry point segment if the coded width and the coded height for the entry point segment are set, and otherwise the active content frame size is indicated by a maximum coded width and a maximum coded height for the video sequence;
    with the video codec, varying a selection of padding content with which the frame of the hybrid video sequence is padded based on the determined picture type of the frame, wherein a first form of padding is used if the frame is a progressive frame, and a second form of padding is used if the frame is an interlaced frame, and wherein the varying the padding content selection further comprises:
        if the frame is a progressive frame, selecting a last row of active content in the frame as the padding content selection, the active content being pixels in an area defined by the active content frame size; and
        if the frame is an interlaced frame, selecting a last row of each field of the active content in the frame as the padding content selection; and
    with the video codec, repeatedly adding the padding content selection after the active content in the frame to expand the frame to a first padded frame size which is a next multiple of a macroblock height if the frame is a progressive frame, and to a second padded frame size which is a next multiple of twice the macroblock height if the frame is an interlaced frame.

10. The method of claim 9, wherein the macroblock height is 16 pixels.

11. The method of claim 1 wherein the encoded data for the video sequence comprises:

a sequence header including a first sequence-layer syntax element indicating the maximum coded width for the video sequence and a second sequence-layer syntax element indicating the maximum coded height for the video sequence;

an entry point header including a first entry point-layer syntax element indicating if the bitstream includes syntax elements for the coded width and the coded height for the entry point segment and, if so, a second entry point-layer syntax element indicating the coded width for the entry point segment and a third entry point-layer syntax element indicating the coded height for the entry point segment;

for the first frame, a first frame header including a first frame-layer syntax element indicating the frame coding mode for the first frame; and for the second frame, a second frame header including a second frame-layer syntax element indicating the frame coding mode for the second frame.

12. The method of claim 1 wherein the active content frame size can align with macroblock boundaries or be non-aligned with macroblock boundaries.

13. The method of claim 1 wherein the encoding the hybrid video sequence further includes determining whether the first frame was coded as a frame of progressive video, separate fields of interlaced video, or a frame of interlaced video based at least in part upon the frame coding mode for the first frame.

14. A method of repeat padding for hybrid video sequences by a video decoder device having a processor and a memory, comprising:

receiving, at the video decoder device, encoded data in a bitstream for a hybrid video sequence having plural frames, the plural frames of the video sequence including both progressive frames and interlaced frames; and with the video decoder device, decoding at least some of the encoded data, including:

determining a maximum coded width and maximum coded height for the video sequence;

for an entry point segment, determining whether to use the maximum coded width and the maximum coded height for the video sequence as coded width and coded height, respectively, for the entry point segment, and, if not, determining the coded width and the coded height for the entry point segment;

determining an active content frame size for a first frame, wherein the active content frame size is a resolution in terms of pixels, wherein the active content frame size of the first frame is indicated by the coded width and the coded height for the entry point segment if the coded width and the coded height for the entry point segment are used, and otherwise the active content frame size is indicated by the maximum coded width and the maximum coded height for the video sequence;

decoding the first frame, the first frame having a macroblock-aligned vertical size that depends at least in part on frame coding mode of the first frame, wherein the decoded first frame is used as a reference frame;

if the reference frame was coded as a frame of progressive video, expanding from the active content frame size of the reference frame using a first form of repeat padding, wherein the first form of repeat padding includes repeating a last row of active content of the reference frame, the active content being pixels in an area defined by the active content frame size;

if the reference frame was coded as separate fields of interlaced video or frame of interlaced video, expanding from the active content frame size of the reference frame using a second form of repeat padding, wherein the second form of repeat padding includes repeating a last row of each field of the active content of the reference frame; and for a second frame of plural frames of the entry point segment, decoding the second frame using motion compensation relative to the reference frame.

15. The method of claim 14 wherein the encoded data comprises:

a sequence header including a first sequence-layer syntax element indicating the maximum coded width for the video sequence and a second sequence-layer syntax element indicating the maximum coded height for the video sequence;

an entry point header including a first entry point-layer syntax element indicating if the bitstream includes syntax elements for the coded width and the coded height for the entry point segment and, if so, a second entry point-layer syntax element indicating the coded width for the entry point segment and a third entry point-layer syntax element indicating the coded height for the entry point segment;

for the first frame, a first frame header including a first frame-layer syntax element indicating the frame coding mode for the first frame; and for the second frame, a second frame header including a second frame-layer syntax element indicating frame coding mode for the second frame.

16. The method of claim 15 wherein the decoding at least some of the encoded data further includes determining whether the first frame was coded as a frame of progressive video, separate fields of interlaced video, or a frame of interlaced video based at least in part upon the frame coding mode for the first frame.

* * * * *